Nov. 20, 1945. D. BENSEL 2,389,117
RETORT FOR PACKAGED FOOD
Filed Nov. 4, 1940 2 Sheets-Sheet 1
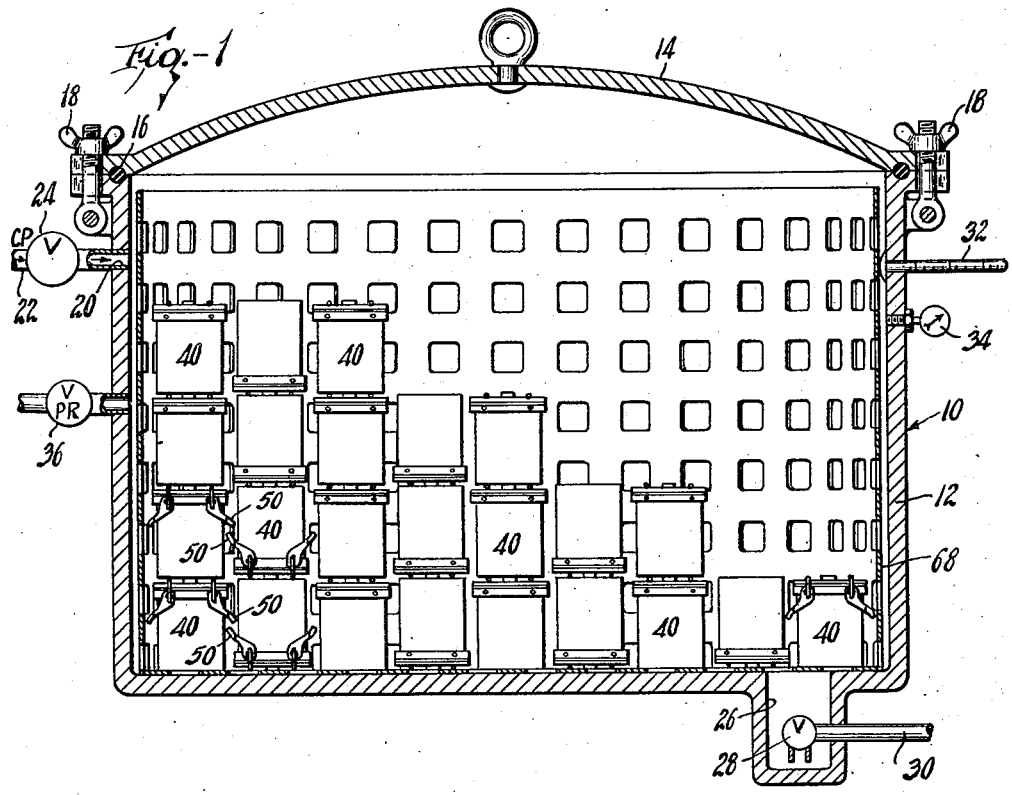
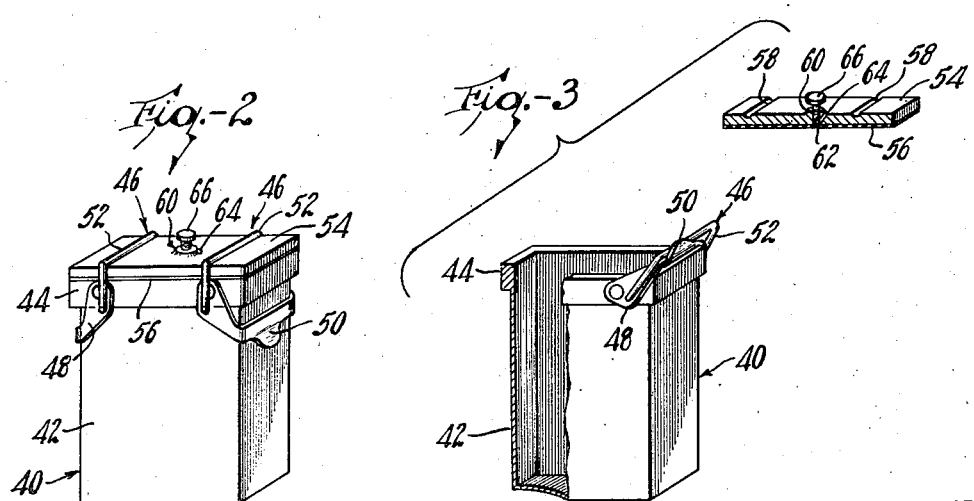
INVENTOR
DURYEA BENSEL
BY
Ely & Frye
ATTORNEYS Nov. 20, 1945. D. BENSEL 2,389,117
RETORT FOR PACKAGED FOOD
Filed Nov. 4, 1940 2 Sheets-Sheet 2

INVENTOR
DURYEA BENSEL

BY Ely & Frye
ATTORNEYS

Patented Nov. 20, 1945

2,389,117

UNITED STATES PATENT OFFICE 2,389,117

RETORT FOR PACKAGED FOOD

Duryea Bensel, Los Angeles, Calif., assignor to Bensel-Brice Corporation, Los Angeles, Calif., a corporation of California Application November 4, 1940, Serial No. 364,125

3 Claims. (Cl. 99—359)

This invention relates to an improvement in apparatus for preserving food products, and, more particularly, to retorts for processing packaged food products.

Apparatus made according to this invention is particularly, though not exclusively, adapted for uses in connection with my method for processing food disclosed in my co-pending application, No. 270,111, filed April 26, 1939, of which this application is a continuation in part. According to the method disclosed in my co-pending application, food may be processed and preserved in packages comprised of a sealed inner container of flexible, impervious film. This invention relates to the retorts for processing such packages of food.

It is an object of this invention to provide each individual package with a closely confining hermetically sealed retort which in turn is used within a bulk retort so that packaged food products will be processed with a minimum number of "swellers" being developed during processing. Another object and advantage of this invention is that apparatus made in accordance therewith permits the use of super-heated steam, which may be supplied at a pressure below the internal pressure developed within the package during processing. A still further object and advantage of this invention is that an improved and an increased area for heat transfer from the heating medium to the packages is possible.

Another object of this invention is to provide an apparatus which will eliminate the use of locked crates or baskets and simplify the handling of the packages being processed. Another object of this invention is to provide apparatus which will eliminate the necessary storage period for the development of "swellers" and which will also eliminate the occasional deteriorating effect of live steam which heretofore came in direct contact with the packages.

Other and further objects and advantages of this invention will be apparent from the following specification, claims, and drawings, in which:

Fig. 1 is a diagrammatic cross-section of a bulk retort, showing the manner of stacking individual cooking containers within the retorts.

Fig. 2 is an isometric view of a closed individual retort.

Fig. 3 is a skeletal fragmentary isometric view, partly in section, of an individual retort opened.

Figure 4:
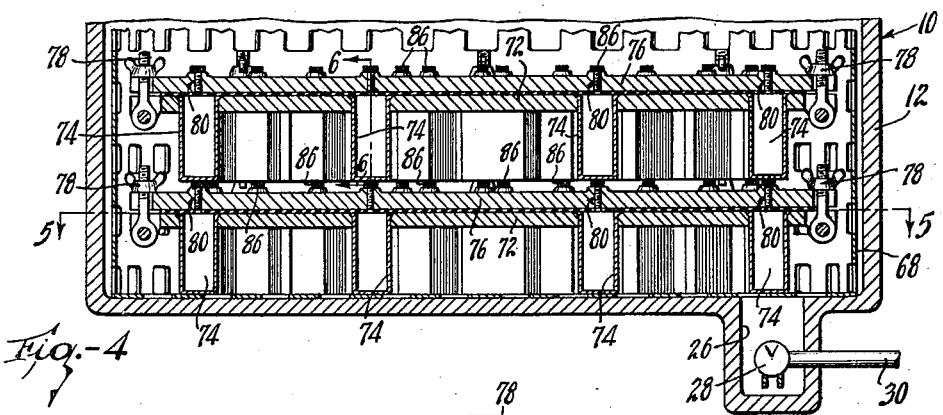
Fig. 4 is a fragmentary view taken along line 4—4 of Fig. 5 and illustrating a modified form of this invention.

In the drawings, in which like reference characters refer to like parts, 10 represents a suitable conventional bulk retort comprising a shell 12 and a cover or door 14 which may be hermetically sealed by means of the gasket 16 carried by the rim of the cover 14 and the thumb-screw clamps 18 or other securing means which may be mounted on the shell 12. The shell 12 is provided with an inlet port 20 which is connected to a suitable source of steam (not shown) by means of the conduit 22. A suitable manually controllable constant pressure inlet valve 24 is provided in the conduit 22 to permit steam to be admitted into the bulk retort 10 at a selected pressure. The shell 12 is also provided with a suitable sump 26 in which is located the normally closed exhaust valve 28 connected to the exhaust conduit 30, the exhaust valve 28 being opened automatically by the collection of condensate in the sump 26 or being opened manually to permit the bulk retort 10 to be blown down prior to opening and removal of the processed food products. The shell 12 is also provided with a suitable thermometer 32, pressure gauge 34, and pressure relief safety valve 36.

The bulk retort 10 is filled with a plurality of individual package retorts or cooking containers 40. As shown in Figs. 2 and 3, a preferred form of package retort for rectangular packages comprises a shell or casing 42 having a rectangular cross-section. The internal dimensions of the casing 42 are so proportioned that the rectangular packages to be processed will be received therein with a good sliding fit and the top of the package will be approximately flush with the top of the casing 42. About the top edge of the casing 42 is welded a rim 44 which is adapted to prevent the open end of the casing 42 from being distorted by the internal pressure developed within the packages received in the casing during processing. A pair of clamping members 46 are pivotably mounted on the front and back portions of the rim 44. As shown in Figs. 2 and 3, each clamping member 46 comprises a clamping hasp having two parallel bell cranks 48 connected by a lipped lifting lug 50, the shorter arms of the bell cranks 48 being pivoted on the front and back portion of the rim 44 adjacent the end portion at a distance from the end walls of the casing 42 which is slightly less than the length of the connected longer arms of the bell cranks. The ends of a U-shaped clamping ring 52 are pivoted in the bell cranks 48 adjacent the apices thereof. A lid 54 is designed to fit the rim 44 and thus close the casing 42. The flat under surface of the lid 54 is provided with a gasket 56 of "neoprene" or similar flexible sheeting adapted to stand up under the high temperatures of the live or super-heated steam. The upper surface of the lid 54 is provided with a pair of shallow grooves 58 adapted to receive the clamping rings 52.

A vacuum relief valve 60 is provided for the package retort 40, preferably in the lid 54, as shown in Figs. 2 and 3. The valve 60 may comprise an internally threaded passage 62 to the interior of the package retort which opens to the atmosphere through the port 64. A threaded valve stem 66 is received in the passage 62, so that it closes the port 64 when it is fully screwed into the passage 62 and uncovers the port 64 when partly screwed out of the passage 62, as shown in Figs. 2 and 3.

In use, a package to be processed is inserted in the casing 42, the lid 54, with the valve 60 closed, is placed on the rim 44 under the clamping rings 52, and the lifting lugs 50 are then snapped from their open position shown in Fig. 3 past the dead center of the pivoted bell crank 48 to the closed position shown in Fig. 2, thus locking the lid 54 on the rim 44 and hermetically sealing the package to be processed within the closely confining package retort 40. It should be noted that in the preferred construction disclosed, the lips on the lifting lugs 50 protrude slightly beyond the end portion of the rim 44 when the package retorts are closed and thus serve as spacing members for the side walls of the package retorts 40. The clamping rings 52 serve as spacing members for the top, front, and back walls of the package retorts 40.

After a plurality of individual package retorts have been thus filled and sealed, they are loaded into the bulk retort 10, preferably by stacking the package retorts 40 in the open crate 68 which is designed to fit the shell 12. A preferred manner of stacking the package retorts 40, as shown in Fig. 1, is to invert alternate package retorts 40 in each tier, thus arranging the packaging retorts compactly while permitting the several package retorts to be spaced endwise from each other by the lips on the lifting lugs of adjacent package retorts and sidewise by the clamping rings 52, which also serve to space the package retorts in adjacent tiers.

It is an advantage of this apparatus that the bulk retort 10 may be filled partly as shown in Fig. 1, or completely. In apparatus employed hertofore, packages, such as tin cans or glass jars, could only be processed in quantities which would completely fill the baskets or crates in which they were stacked. After the desired number of package retorts have been loaded in the crate 68, the crate is lowered into the bulk retort 10, the cover 14 is sealed shut and steam is admitted through the port 20. As the steam strikes the cooler walls of the bulk retort 10 and the package retorts 40, a certain amount condenses, the condensate collects in the sump 26 and is exhausted through the exhaust conduit 30 when a sufficient amount of condensate is collected to open valve 28. More steam is thus admitted by the constant pressure valve 24. After the package retorts have been thus processed for the length of time necessary to thoroughly sterilize and cook the food within the packages, the inlet valve 24 is closed, the exhaust valve 28 is opened to permit the steam within the bulk retort 10 to blow down, and the cover 14 is opened. The package retorts 40 are thus lifted out of the bulk retort 10 and are simply dumped into a suitable cooling vat or canal. The crate 68 is then loaded with the succeeding batch of package retorts to be processed. After being suitably cooled, the package retorts are opened, emptied, and returned for reloading. The unloaded processed packages are then packed for shipping.

To open the individual package retorts 40, the lugs 50 are lifted past their center on the bell crank 48 and the clamping rings 52 are removed from the grooves 58. The valve 60 is then opened to admit atmospheric air to the interior of the retort 40 by unscrewing the valve stem 66 to uncover the port 64. Unless the vacuum release valve 60 or a similar valve is provided, a partial vacuum which is created in the retort 40 will hold the lid 54 on the rim 55. Why such a partial vacuum is created within the retort 40 during processing is not fully understood. The gasket 56 renders the retort 40 liquid-tight whenever the lid 54 is clamped on the rim 44 and the gasket 56 certainly renders the retort 40 gastight after the package in the retort 40 has been processed. It is believed, however, that when the retorts 40 are first being processed, a certain amount of air trapped within the retort 40 may expand rapidly and escape either through the joint sealed by the gasket 56 or through the microscopic pores in the casing 42. Thus, where the term "hermetically sealed" is used in this specification and the appended claims to describe the closure of the retorts 40, it is to be understood that the closure is such that it will prevent the entrance of fluids into the retort but may not absolutely prevent the escape of gases trapped within the retort when it is closed.

In apparatus used heretofore, in which packages such as tin cans were compactly stacked in locked crates or baskets, care had to be taken to maintain the steam at a pressure which would balance the internal pressure developed within the packages to prevent them from being crushed or exploded; regardless of the amount of care exercised, the packages were strained during the processing, particularly during the periods when the live steam was first admitted to the processing retort and during the period when the packages were removed from the retort to the cooling vat. Thus, a certain percentage of "swellers" caused by ruptured or weakened seams in the package were expected and the processed packages were held in stock a sufficient length of time to permit spoilage to develop and cause the defective packages to swell. With apparatus made according to this invention, the packages are closely confined and cannot expand to rupture or strain the seams.

Also, because the package retorts 40 are made amply strong to withstand both the external pressure of the heating medium and the internal pressure developed by the food being processed, these internal and external pressures do not have to be balanced in the apparatus disclosed. Thus, less care is required in operating the apparatus and a heating medium having a higher heat content, namely, superheated steam, may be supplied at a lower pressure than the internal pressure developed within the packages.

The mass of metal in the package retorts does not materially increase the length of time required to process the food. This may be attributed to several factors, namely, all surfaces of the package retort are contacted by the heating medium, the circulation of the heating medium through the bulk retort is improved, an increased surface is presented to the heating medium, and a heating medium of higher heat content may be employed.

Figure 5:
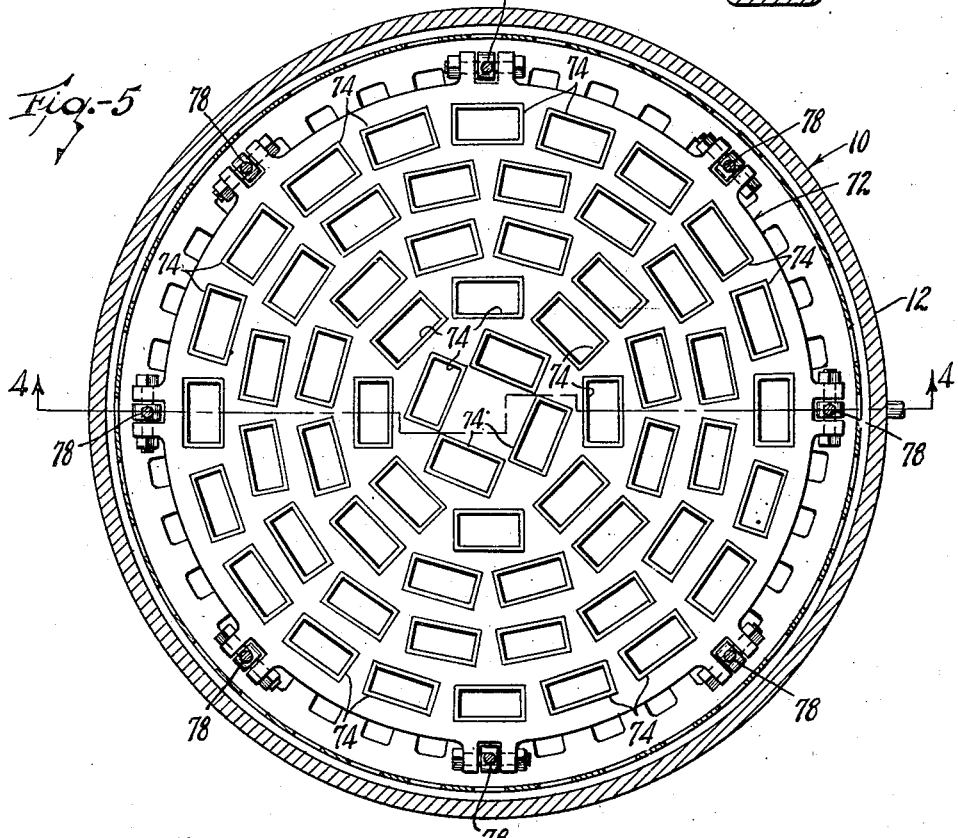
Fig. 5 is a sectional plan view taken along the line 5—5 of Fig. 4.
Figure 6:
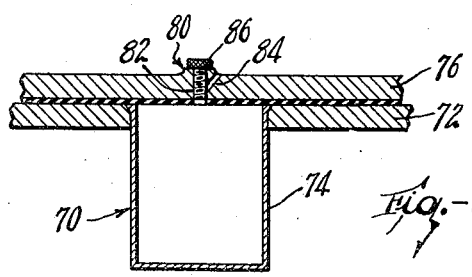
Fig. 6 is a fragmentary sectional view taken along the line 6—6 of Fig. 4.

A modified form of a package retort designed to carry a plurality of packages and to provide substantially all of the advantages of the package retort 40 is illustrated in Figs. 4, 5, and 6. As shown in the drawings, the multiple retort 70 comprises a rim plate 72 punched to receive a plurality of casings 74. Since the package retort 70 in the embodiment disclosed is designed for processing rectangular packages, the cross-section of the casings 74 is rectangular. The internal dimensions of the casings 74 are so proportioned that the packages to be processed will be received therein with a good sliding fit and the tops of the packages will be approximately flush with the top edges of the casings 74, which in turn are flush with the upper surface of the rim plate 72. A cover plate 76, the lower surface of which is provided with suitable gasket material, such as "neoprene," for example, fits on the rim plate and is secured thereto by clamps 78. The cover plate is provided with a plurality of vacuum relief valves 80, each valve 80 having a threaded passage 82 which opens the interior of each casing 74 to the atmosphere through a port 84. The port 84 is normally closed by the threaded valve stem 86, as shown in Fig. 6.

In operation, the packages to be processed are placed in the closely confining casings 74 and are hermetically sealed therein by clamping the cover plate 76 to the rim plate 72. The multiple package retorts 70 are then loaded into the bulk retort 10 which may thus be operated in the same manner described in connection with the package retorts 40. By suitably spacing the casings 74 in the rim plate 72 and because the vacuum relief valves 80 serve as suitable spacing elements, a thorough circulation of the heating medium in the bulk retort is assured.

From the foregoing, it is apparent that apparatus made according to this invention need not be limited to the embodiment disclosed but may be modified to meet the needs and requirements of the packages to be processed. Also, while this invention has been illustrated and described for use where steam is the heating medium employed, because the packages to be processed do not come in contact with the heating medium, heating mediums other than steam may be employed. This invention, therefore, is to be limited only within the scope of the following claims.

What is claimed is:

1. In an apparatus for sterilizing and preserving packaged food, a multiple package retort comprising an open ended casing, internal walls in said casing adapted to fit and closely confine a package received in said casing, a rim plate punched to receive the open end of said casing, a cover plate adapted to engage the top of a package received in said casing and to engage said rim plate, and means for hermetically sealing said cover plate on said rim plate.

2. In an apparatus for sterilizing and preserving packaged food, a multiple package retort comprising a plurality of open ended casings, each casing being proportioned and designed to confine and limit the expansion of a food package received therein, a rim plate having a plurality of openings therein to receive the said casings, the top of said casings being flush with the top surface of said rim plate, a cover plate having an under surface configured to engage the upper surface of said rim plate and the tops of packages received in said casings, a gasket extending over the undersurface of said cover plate, and clamping means to hermetically seal said cover plate to said rim plate.

3. In an apparatus for sterilizing and preserving packaged food, a multiple package retort comprising a plurality of open ended casings, each casing being proportioned and designed to confine and limit the expansion of a food package received therein, a rim plate having a plurality of openings therein to receive the said casings, the top of said casings being flush with the top surface of said rim plate, a cover plate having an under surface configured to engage the upper surface of said rim plate and the tops of packages received in said casings, a gasket extending over the under surface of said cover plate, clamping means to hermetically seal said cover plate to said rim plate, and a plurality of normally closed manually operable vacuum relief valves carried by said cover plate, each vacuum relief valve communicating with the interior of a casing.

DURYEA BENSEL.